Dec. 15, 1925. 1,565,829
P. THIBAUDEAU
LOADING MACHINE
Filed April 29, 1925 3 Sheets-Sheet 3
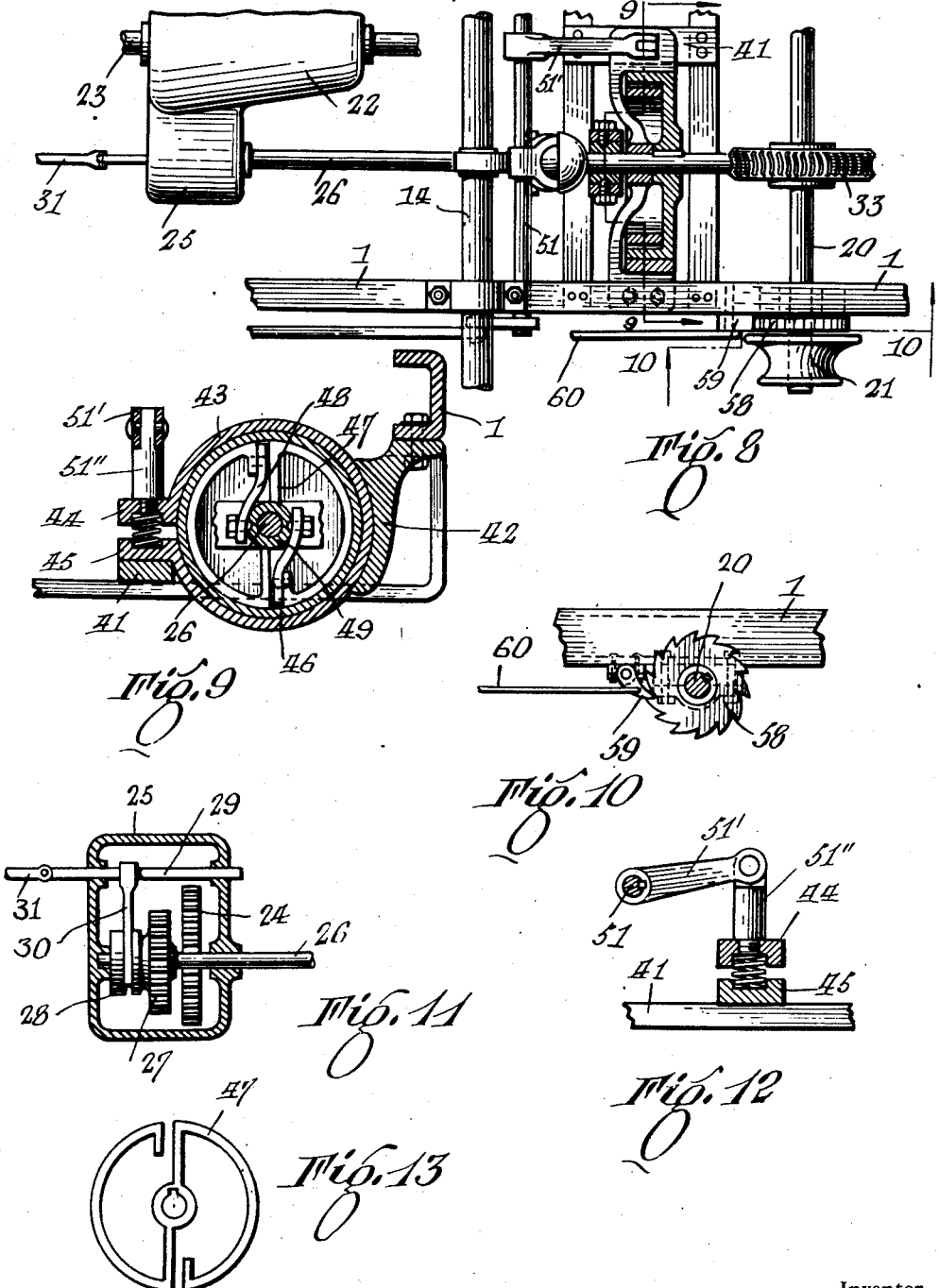
Inventor
Paul Thibaudeau
By William Chinton
Attorney Patented Dec. 15, 1925.

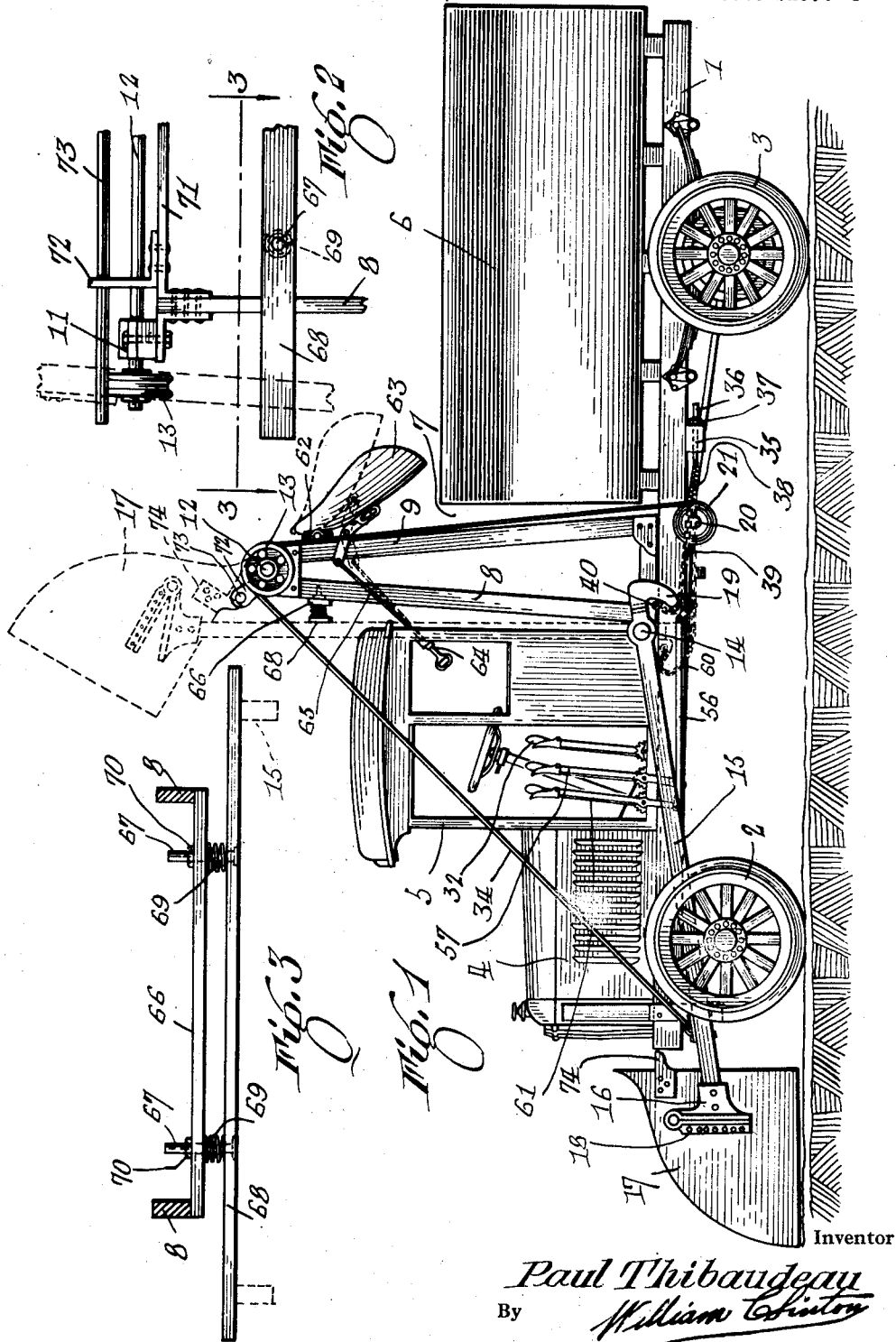

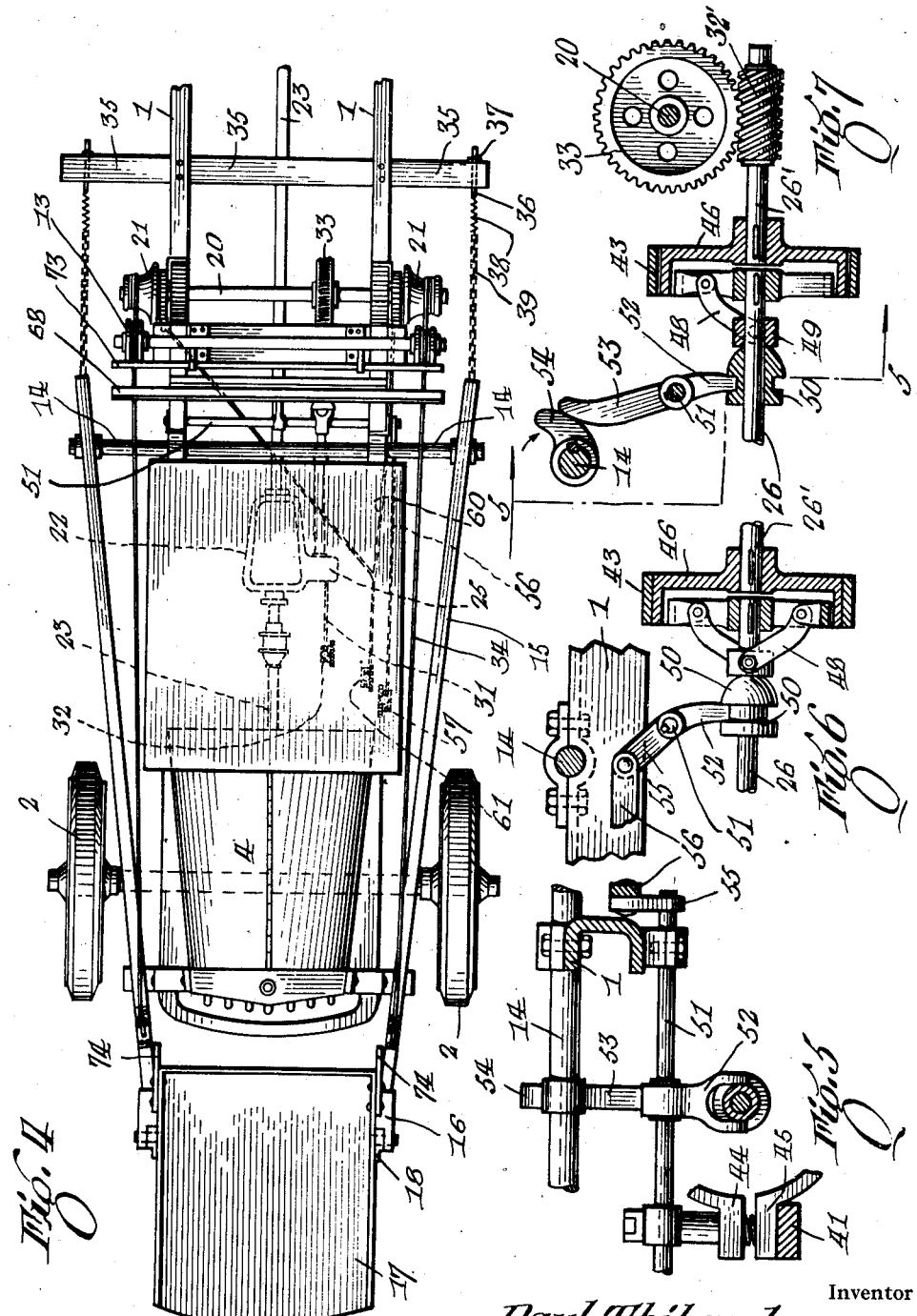

1,565,829

UNITED STATES PATENT OFFICE.

PAUL THIBAUDEAU, OF QUEBEC, QUEBEC, CANADA, ASSIGNOR OF THIRTY PER CENT TO ALEXANDER JOHN WELCH, OF QUEBEC, CANADA.

LOADING MACHINE.

Application filed April 29, 1925. Serial No. 26,757.

*To all whom it may concern:*

Be it known that I, PAUL THIBAUDEAU, subject of the King of Great Britain, residing at Quebec, in the Province of Quebec, Canada, have invented certain new and useful Improvements in Loading Machines; and I do hereby declare that the following is a full, clear, and exact description of the invention, such as will enable others skilled in the art to which it appertains to make and use the same.

The present invention pertains to a novel loading machine in the form of a vehicle supporting a bucket and apparatus for operating the bucket.

The principal object of the invention is the provision of a device of this character which is comparatively simple in construction and efficient in operation. The device comprises a main shaft laid across the frame of the vehicle and having a pair of arms secured thereto. The arms carry a bucket adapted to swing in a vertical plane and to discharge into the body of the vehicle. The movement of the arms is accomplished through a drive shaft geared to the power shaft which in turn is geared to the transmission mechanism of the vehicle. Around the drums are wound cables connected to the arms and thus controlling the movement of the bucket.

A particular feature of the invention is a clutch mechanism on the power shaft which automatically comes into operation when the bucket and arms are nearing the end of the upward stroke. This function is accomplished by means of a connection between the clutch and the main shaft carrying the arms. Also, an independent means for operating the clutch as desired by the operator is provided.

The invention is fully disclosed in the following description and in the accompanying drawings, in which:

Figure 1 is a side elevation of the apparatus;

Figure 2 is a fragmentary front elevation of the upper part of the apparatus;

Figure 3 is a section on the line 3—3 of Figure 2;

Figure 4 is a plan view;

Figure 5 is a fragmentary transverse section on the line 5—5 of Figure 7;

Figures 6 and 7 are fragmentary longitudinal sections;

Figure 8 is a horizontal section of the clutch;

Figure 9 is a section on the line 9—9 of Figure 8;

Figure 10 is a section on the line 10—10 of Figure 8;

Figure 11 is a sectional view of the transmission housing;

Figure 12 is an elevation at right angles to Figure 9; and

Figure 13 is an end of the expansible clutch block.

Reference to these views will now be made by use of like characters, which are employed to designate corresponding parts throughout.

The apparatus is carried by a motor truck comprising a chassis 1, front wheels 2, rear wheels 3, a motor 4, cab 5, and body 6. The body is spaced from the cab as at 7, and in the space is provided a supporting structure consisting of a pair of uprights 8 and a pair of props 9. The uprights and props converge and support at their upper ends a pair of bearings 11 in which is mounted a pulley shaft 12. Pulleys 13 are provided at the ends of the shaft 12.

On the chassis of the machine is journaled a transverse main shaft 14 disposed directly behind the cab. To the ends of this shaft are secured a pair of elongated arms 15 as shown in Figures 1 and 4. The forward end of each arm carries a foot 16, and between the two feet is pivoted a scoop or bucket 17. The sides of this member carry angle bars 18 adapted to engage the feet 16 and to be stopped thereby. The lower ends of the arms 15 are provided with curved fingers 19, the purpose of which is pointed out below.

Rearwardly of the shaft 14 and preferably on the lower surface of the chassis is journaled a drive shaft 20 carrying drums 21 at its ends. The transmission housing 22 is penetrated by the transmission shaft 23 on which is mounted a drive gear 24 (Figure 11). The housing has an extended or supplemental portion 25 through which is passed the power shaft 26. The latter carries a slidable drive pinion 27 which carries a grooved collar 28. A shifting rod 29 is also passed through the part 25 and carries a shifter 30 engaging the collar. The rod 29 is connected by means of a link 31 to a control apparatus 32 mounted within the cab. By means of the latter, the pinion 27 may be brought into or out of engagement with the drive gear 24 thereby to control the power shaft 26. At the rear end of the shaft is an alined shaft section 26' which carries a worm 32' meshing with a worm gear 33 on the drive shaft 20 as shown in detail in Figure 7. To the forward end of each arm 15 is attached a cable 34 passed over one of the pulleys 13 and connected to the corresponding drum 21. At each side of the chassis and behind the shaft 20 is mounted a boss 35 through which is passed a rod 36 having a nut 37 at its rear end. A spring 38 is attached to the forward end of the rod and is connected to a chain 39 which is also fastened into the finger 19 of the corresponding arm 15 by means of a hook or clip 40.

A supporting bar 41 is laid parallel to one of the sides of the chassis 1 as shown in Figure 9 for the purpose of supporting the brake. The chassis side has secured thereto a shoe 42 which engages the split band 43 of a clutch. The band is provided at its ends with flanges 44 and 45 the latter resting on the bar 41. Within the band is provided a friction lining or drum 46, and within this are disposed an expansible circular brake block 47 engaging the circumference of the lining.

The block is provided with forwardly extending arms 48 which are pivotally related by being pivoted to a ring 49 surrounding the power shaft 26. Adjacent the ring, the shaft 26 carries a slidable socket member 50. Above this member, a rod 51 is journaled across the chassis as shown in Figure 4 and has fixed thereto a fork 52 engaging the socket and terminating at its other end in a finger 53. The main shaft 14 carries a cam 54 engaging the finger 53 as shown in Figure 7. One end of the rod 51 has secured thereto a short link 55 connected to a longer link 56. The latter is extended to the cab 5 and may be shifted by a control apparatus 57. By means of this apparatus, the socket 50 may be shifted on the shaft 26 to expand or contract the block 47, thereby connecting or releasing the shaft 26' with respect to the shaft 26.

Adjacent each drum 21 is mounted a ratchet wheel 58 on the shaft 20. Each wheel is engageable by a pawl 59 pivoted to a side of the chassis as shown in Figure 10. From each pawl extends a link 60 to the cab and controllable therein by mechanism 61.

To the props 9 is secured a transverse bar 62 disposed slightly below the shaft 12. To this bar is pivoted a guide member 63 which is connected to an adjustable handle 64 supported by the props. A link 65 is connected to the handle and extends into the cab as shown in Figure 1. Across the forward faces of the uprights 8 is secured a transverse bar 66 through the ends of which are passed stems 67. A cushioning bar 68 is attached to the forward ends of the stems in parallel relation to the member 66. The stems are surrounded by springs 69 engaging the two bars and are prevented from slipping away by means of nuts 70 carried at the rear ends thereof. To the upper ends of the members 8 and 9 is secured a transverse bridge 71 illustrated in Figure 2. To the ends of this member are attached lugs 72 which support a transverse stop rod 73. This member is engageable by stop 74 carried by the sides of the bucket 17.

The operation of the device is as follows: When the bucket 17 is filled, the control mechanism 32 is actuated to shift the rod 29 for the purpose of bringing the drive pinion 27 in engagement with the power gear 24. The power shaft 26 is thereby actuated, and the lever 57 is now operated by hand. This draws the link 56 and turns the rod 51. The arm 51' carried by the rod and the stem 51" depending from the arm cause a tightening of the band 43 against the drum 46. At the same time the fork 52 actuated by the rod 51 shifts the socket member 50, whereby the block 47 is expanded against the drum 46. A clutch connection is thus made between the shafts 26 and 26', and the latter imparts rotation to the drive shaft 20 through the medium of the worm 32' and wheel 33. The apparatus 61 must be actuated to release the pawl 59 from the ratchet 58. The rotation of the drums 21 winds the cables 34 and raises the arms 15 together with the loaded bucket. As the latter approaches its uppermost position, the arms 15 engage the cushioning bar 68 to absorb the shock which might be caused by the stopping of the moving parts. The stops 74 engage the rod 73, whereby the bucket is tilted with reference to the feet 16 as shown in dotted lines in Figure 1. By means of the link 65, the guide member is disposed to conduct the load into a particular part of the body 6, according to the nature of the load already contained in the latter. During the upward movement of the arms 15, the fingers 19 have moved forwardly and expanded the springs 38. At the end of the upward stroke, the cam 54 comes into contact with the finger 53 and automatically withdraws the socket 50 in order to release the blocks 47 from the drum 46. The object of this action is to prevent strain on the clutch connection in the event that the shaft 26 is still in motion when the bucket is at the end of its upward stroke. At the moment that the cam 54 engages the finger 53, the lever 57 is shifted, and the operator continues the movement of the lever in the reverse direction in order again to tighten the band 43 so as to hold the bucket 17 in its raised position for discharge. At the same time, the mechanism 61 is actuated to bring the pawls 59 again into engagement with the ratchets 58 to prevent the bucket from dropping. When the bucket is emptied, the pawls are released from the ratchets. The lever 57 is now shifted, and the above described movement emanating from the lever is reversed to break the connection between the shafts 26 and 26' whereby the arms and bucket are free to start on the downward stroke. The bucket turns forwardly on its pivotal connections with the feet 16, and this movement is limited by the engagement of the angle irons 18 with the feet. Also, the compressed springs 69 aid in starting the downward movement. During the descent of the bucket, care must be taken to disengage the gear 27 (Figure 11) from the transmission mechanism of the motor 4. The rotation of the main shaft 14 on the upward stroke, causes the cam 54 to swing the lower end of the lever 52 whereby the socket member 50 is pushed away from the ring 49. The pawls 59 are brought into engagement with the ratchets 58 for the further object of holding the bucket raised when the machine is not in operation or when it is moving from one place to another.

While a specific embodiment of the invention has been illustrated and described, it is to be understood that various alterations in the details of construction may be made without departing from the spirit of the invention as indicated by the appended claim.

Having thus fully described the invention, what I claim as new and desire to protect by Letters Patent is:—

A loading machine comprising in combination with a vehicle, a main shaft journaled on said vehicle, a pair of arms secured to said shaft, a bucket carried by said arms, a power shaft for actuating said arms, a clutch mounted in the power shaft, a rod journaled in parallel relation to said main shaft, a lever secured to said rod and adapted to actuate said clutch, a cam carried by the main shaft and adapted to engage said lever, and a linkage is secured to the rod for independently actuating the lever.

In witness whereof I have hereunto set my hand.

PAUL THIBAUDEAU.